Patented June 12, 1945

2,378,102

UNITED STATES PATENT OFFICE 2,378,102

COMPOSITION OF MATTER

Gaetano Provenzano, New York, N. Y.

No Drawing. Application January 8, 1943,
Serial No. 471,733

1 Claim. (Cl. 260—750)

This invention relates to improvements in compositions of matter, particularly adapted for use in the manufacture of vehicle tires, balloons, cushions or inflatables.

The cost and scarcity of rubber has compelled manufacturers to search for substitute material.

Such material must have a definite degree of resiliency, be of moderate weight, produce good tractive characteristics and must be produced at a low cost.

After lengthy experimentation it has been found that an admixture of essentially simple and well known elements, when properly combined and molded under pressure, have produced unexpectedly satisfactory results at an expense far less than that of the cheapest rubber tire.

It is therefore the main object of the invention to provide a composition of matter for the manufacture of vehicle tires, comprising ashes, cotton fibers, glue, rubber, sawdust and sand.

A further feature is in the provision of a tire material substitute exhibiting resiliency, tenacity and ground gripping effect, together with freedom from blow-outs, punctures and the like.

The ashes are obtained from wood, finely sifted and free of impurities; the cotton is preferably long staple, cleaned of seed and suitable for weaving.

The glue is selected from the best fish glue and used in solution to bind the cotton fibers and ashes into a conglomerate mass, to which is added sharp sand and pine sawdust, the whole to be molded under pressure into such conventional shape as may be desired.

In one hundred pounds of the batch, there is used three to six pounds wood ash, ten to fifteen pounds cotton fibres, old reclaimed ground rubber twenty-five to forty pounds, sawdust ten to twelve pounds, sand twelve to eighteen pounds and waterproof glue twenty pounds.

All these several ingredients are thoroughly mixed, in the presence of sufficient water to render the batch plastic and homogenous, poured into a metal mold and subjected to pressure until the glue and rubber have become firmly set.

The sand affords an efficient grip, prevents slipping, even on icy surfaces, the rubber supplies the required resiliency, the cotton fibers acts as a binder, while the ash operates to fill in any crevices that may exist, the tenacity of the elements being obtained by the glue, which is of a waterproof type.

Having thus described the invention what is claimed as new and sought to secure by Letters Patent is:

A composition for vehicle tires consisting of a mass combined from a mixture of five parts of wood ash, fourteen parts of cotton fibres, thirty-five parts of reclaimed rubber, twelve parts of sawdust, fourteen parts of sand and twenty parts of waterproof glue.

GAETANO PROVENZANO.